(12) United States Patent
Yin et al.

(10) Patent No.: US 8,762,782 B2
(45) Date of Patent: Jun. 24, 2014

(54) BASIC INPUT-OUTPUT SYSTEM CIRCUIT AND METHOD FOR USING THE SAME

(75) Inventors: Ji-Zhi Yin, Shenzhen (CN); Cun-Hui Fan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 737 days.

(21) Appl. No.: 12/986,189

(22) Filed: Jan. 7, 2011

(65) Prior Publication Data

US 2012/0079260 A1    Mar. 29, 2012

(30) Foreign Application Priority Data

Sep. 27, 2010   (CN) .......................... 2010 1 0293666

(51) Int. Cl.
*G06F 11/00*    (2006.01)
(52) U.S. Cl.
USPC ........................................................... 714/36

(58) Field of Classification Search
USPC ............................................................ 714/36
See application file for complete search history.

(56) References Cited

U.S. PATENT DOCUMENTS

| 2005/0204123 | A1* | 9/2005 | Lee | ................................. | 713/2 |
| 2008/0288764 | A1* | 11/2008 | Lu | ..................................... | 713/2 |
| 2011/0179211 | A1* | 7/2011 | Li et al. | ........................ | 710/306 |

* cited by examiner

*Primary Examiner* — Scott Baderman
*Assistant Examiner* — Jigar Patel
(74) *Attorney, Agent, or Firm* — Novak Druce Connolly Bove + Quigg LLP

(57) ABSTRACT

A BIOS circuit for a computer includes a baseboard management controller (BMC), a central processing unit (CPU), a main basic input-output system (BIOS) storage, and a subsidiary BIOS storage. Both the main BIOS storage and the subsidiary BIOS storage store programs for controlling the computer. The CPU executes the programs stored in the main BIOS storage to control the computer. When data of the programs stored in the main BIOS storage is missing or corrupted, the BMC copies data of the programs stored in the subsidiary BIOS storage to the main BIOS storage to recover the missing or corrupted data in the main BIOS storage.

11 Claims, 2 Drawing Sheets

BASIC INPUT-OUTPUT SYSTEM CIRCUIT AND METHOD FOR USING THE SAME

BACKGROUND

1. Technical Field

The present disclosure relates to basic input-output system (BIOS) circuits of computers, and particularly to a BIOS circuit with data recovery function and a method for using the same.

2. Description of Related Art

In a computer, many necessary programs, such as power on self test (POST) program, initializing program, and bootstrap program, are stored in a BIOS of the computer. When data of these programs is missing or corrupted, the computer may malfunction (e.g., a BIOS crash occurs). In this condition, the BIOS needs to be reflashed. However, most conventional methods for reflashing the BIOS are complicated and cost much time.

Therefore, there is room for improvement within the art.

BRIEF DESCRIPTION OF THE DRAWINGS

Many aspects of the present BIOS circuit and method for using the same can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
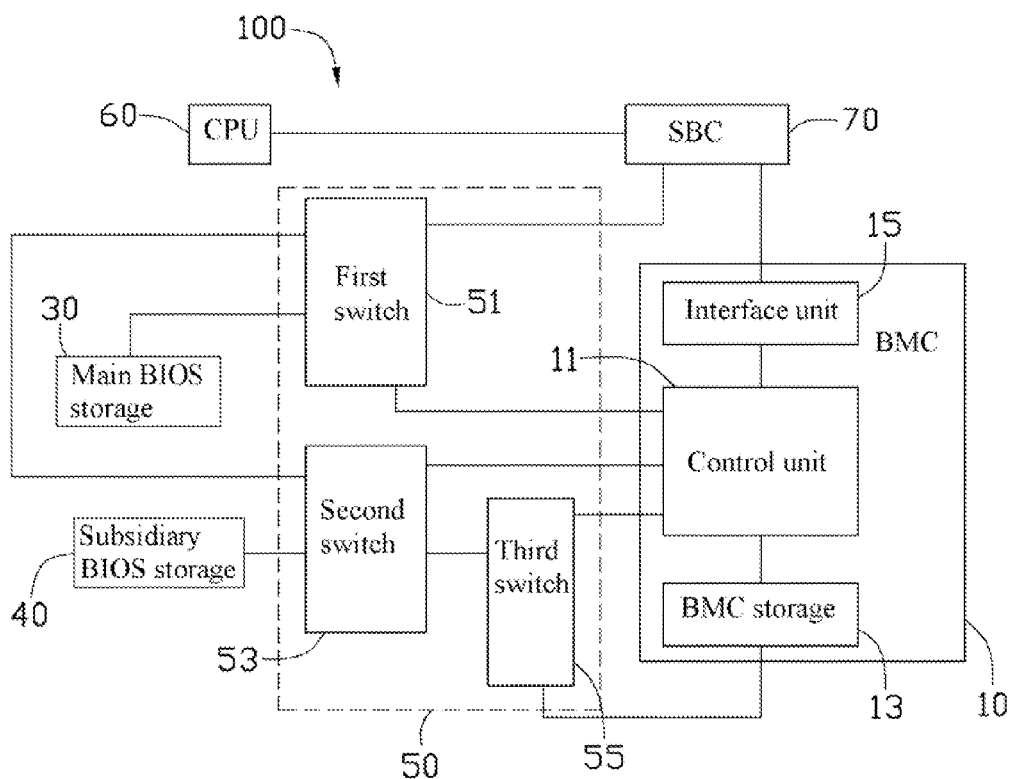
FIG. 1 is a block diagram of a BIOS circuit, according to an exemplary embodiment.

FIG. 1 shows a block diagram of a BIOS circuit 100, according to an exemplary embodiment. The BIOS circuit 100 is used in a common computer (not shown) to store necessary programs of the computer, such as POST program, initializing program, and bootstrap program, etc, and control the computer (e.g., turn the computer on) using these programs. The BIOS circuit 100 includes a baseboard management controller (BMC) 10, a main BIOS storage 30, a subsidiary BIOS storage 40, a switch unit 50, a central processing unit (CPU) 60, and a south bridge chip (SBC) 70. The BMC 10, the CPU 60, and the SBC 70 can be integrated with conventional BMC, CPU, and SBC of the computer.

The BMC 10 includes a control module 11, a BMC storage 13, and an interface unit 15. The BMC storage 13 and the interface 15 are both connected to the control module 11. The interface unit 15 is also connected to the SBC 70, and the SBC 70 is connected to the CPU 60. Thus, the CPU 60 can communicate with the control module 11 through the SBC 70 and the interface unit 15.

The switch unit 50 includes a first switch 51, a second switch 53, and a third switch 55. The first switch 51, the second switch 53, and the third switch 55 are all connected to the control unit 11 and are controlled to be switched on/off by the control unit 11. The first switch 51 is also connected to the SBC 70, the main BIOS storage 30, and the second switch 53. The second switch 53 is also connected to the subsidiary BIOS storage 40 and the third switch 55. The third switch 55 is also connected to the BMC storage 13. The control unit 11 can further control the first switch 51 to selectively connect any two of the SBC 70, the second switch 53, and the main BIOS storage 30 to each other, and control the second switch 53 to selectively connect any two of the subsidiary BIOS storage 40, the first switch 51, and the third switch 55 to each other.

Both the main BIOS storage 30 and the subsidiary storage 40 store aforementioned necessary programs for controlling the computer. In use, the CPU 60 executes the programs stored in the main BIOS storage 30 to control the computer, for example, to turn the computer on. If data of the programs stored in the main BIOS storage 30 is missing or corrupted, the BMC 10 copies the programs stored in the subsidiary BIOS storage 40 to the main BIOS storage 30.

Figure 2:
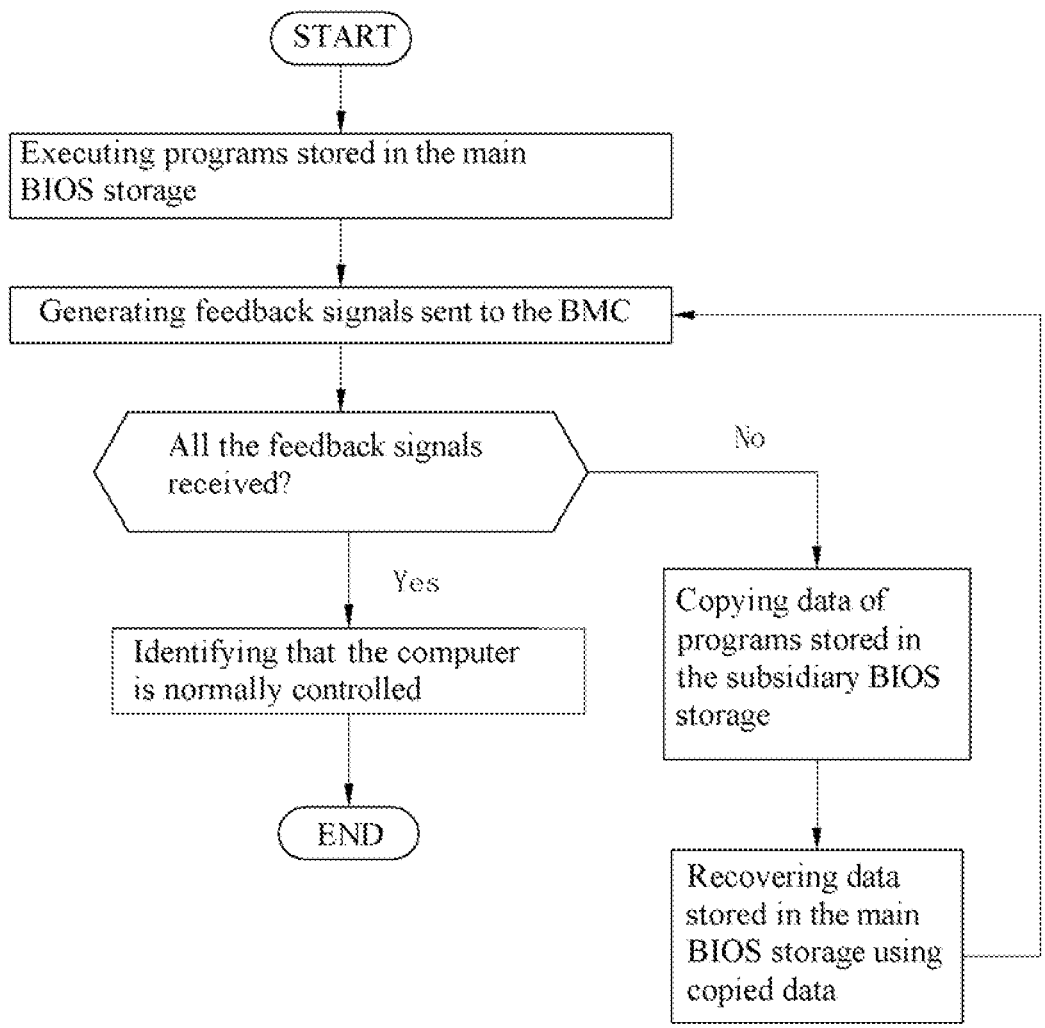
FIG. 2 is a method for using one exemplary embodiment of the BIOS circuit shown in FIG. 1, according to an exemplary embodiment.

FIG. 2 shows a method for using the BIOS circuit 100 to control the computer, according to an exemplary embodiment. This exemplary embodiment is a method for using the BIOS to turn the computer on, and includes these operations as follows. Depending on this embodiment, additional operations may be added, others removed, and the ordering of these operations may be changed.

First, the control unit 11 controls the first switch 51 to connect the SBC 70 to the main BIOS storage 30. The CPU 60 is then connected to the main BIOS storage 30 through the SBC 70 and the first switch 51, and executes the programs stored in the main BIOS storage 30 by conventional means. When the CPU 60 successfully executes the programs stored in the main BIOS storage 30, it sends feedback signals to the control unit 11 through the SBC 70 and the interface unit 15. Upon receiving the feedback signals, the control unit 11 maintains the first switch 51 to connect the main BIOS storage 30 to the SBC 70.

Particularly, the CPU 60 can generate different kinds of feedback signals sent to the control unit 11. These feedback signals correspond to the programs stored in the main BIOS storage 30, and each kind of the feedback signals is used to inform the control unit 11 that the corresponding program stored in the main BIOS storage 30 is successfully executed. In this embodiment, the CPU 60 generates a first feedback signal to the control unit 11 when it successfully executes the initializing program, generates a second feedback signal to the control unit 11 when it successfully executes the POST program, and generates a third feedback signal to the control unit 11 when it successfully executes the bootstrap program. Each time the computer is started, and all the programs stored in the main BIOS storage 30 have been successfully executed, the control unit 11 identifies that the computer is successfully turned on (i.e., normally controlled by the BIOS circuit 100) and does not perform any additional operations.

If any kind of aforementioned feedback signals is not timely received by the control unit 11 in a starting process of the computer, the control unit 11 assumes data of the program corresponding to the missing feedback signal is missing or corrupted. In this condition, the control unit 11 switches the third switch 55 on, and controls the second switch 53 to connect the subsidiary BIOS storage 40 to the third switch 55. In this way, the BMC storage 13 is connected to the subsidiary BIOS storage 40 by the third switch 55 and the second switch 53. The control unit 11 then controls the BMC storage 13 to copy data of the program corresponding to the missing feedback signal stored in the subsidiary BIOS storage 40 and temporarily stores copied data in the BMC storage 13.

The control unit 11 controls the second switch 53 to connect the first switch 51 to the third switch 55, and controls the first switch 51 to connect the second switch 53 to the main BIOS storage 30, thereby connecting the BMC storage 13 to the main BIOS storage 30 via the third switch 55, the second switch 53, and the first switch 51. Thus, the control unit 11 controls the BMC storage 13 to transmit the copied data to the main BIOS storage 30 to replace the missing or corrupted data stored in the main BIOS storage 30, i.e., performing a data recovery operation for the main BIOS storage 30. Finally, the control unit 11 controls the first switch 51 to connect the SBC 70 to the main BIOS storage 30, and the CPU 60 executes the programs stored in the main BIOS storage 30 again. Subsequent operations can be performed according to above method.

In this embodiment, the control unit 11 can recognize when data of one or more programs stored in the main BIOS storage 30 is missing or corrupted when it does not timely receive the corresponding feedback signals from the CPU 60. In this condition, the control unit 11 can control the BMC storage 13 to copy and store data of all programs corresponding to the missing feedback signals stored in the subsidiary BIOS storage 40 in a same copy and store operation, and transmit the data of all programs corresponding to the missing feedback signals to the main BIOS storage 30 in a same data recovery operation. In other words, rather than having to repeat recovery steps for each program with missing or corrupt data, recovery can be processed in a batch, thus saving considerable time.

Furthermore, when the main BIOS storage 30 is damaged or separated, the control unit 11 can control the first switch 51 to connect the SBC 70 to the second switch 53, and control the second switch 53 to connect the subsidiary BIOS storage 40 to the first switch 51. Thus, the CPU 60 is connected to the subsidiary BIOS storage 40 via the first switch 51 and the second switch 53. In use, the CPU 60 executes the programs stored in the subsidiary BIOS storage 40 to actuate the computer. Until the main BIOS storage 30 restores, the control unit 11 controls the first switch to connect the SBC 70 to the main BIOS storage 30, and the CPU 60 executes the programs stored in the main BIOS storage 30 again, according to above detailed method.

The present BIOS circuit 100 can control the computer using the programs stored in the main BIOS storage 30 or the subsidiary BIOS storage 40, and automatically recover data stored in the main BIOS storage 30. Compared with conventional data recovery methods, the present method for using the BIOS circuit 100 to recover data stored in the main BIOS storage 30 is simpler and easier.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A basic input-output systems (BIOS) circuit for a computer, comprising:
   a baseboard management controller (BMC);
   a central processing unit (CPU) connected to the BMC;
   a main basic input-output system (BIOS) storage connected to the BMC and the CPU;
   a subsidiary BIOS storage connected to the BMC and the CPU; and
   a switch unit comprising a first switch, a second switch, and a third switch; the first switch connected to the CPU, the BMC, and the main BIOS storage; the second switch connected to the first switch, the subsidiary BIOS storage, the third switch, and the BMC; the third switch connected to the second switch and the BMC;
   wherein both the main BIOS storage and the subsidiary BIOS storage store programs for controlling the computer, and the CPU executes the programs stored in the main BIOS storage to control the computer; when data of the programs stored in the main BIOS storage is missing or corrupted, the BMC copies data of the programs stored in the subsidiary BIOS storage to the main BIOS storage to recover the missing or corrupted data in the main BIOS storage;
   the CPU executes the programs stored in the main BIOS storage to control the computer when the BMC controls the first switch to connect the main BIOS storage to the CPU; the BMC copies the data of the programs stored in the subsidiary BIOS storage when the second switch and the third switch is controlled by the BMC to connect the subsidiary BIOS storage to the BMC, and transmits the copied data to the main BIOS storage when the first switch, the second switch, and the third switch is controlled by the BMC to connect the main BIOS storage to the BMC.

2. The BIOS circuit as claimed in claim 1, wherein the BMC includes a control unit, an interface unit, and a BMC storage, both the interface unit and the BMC storage connected to the control unit; the interface unit connected to the CPU, the control unit connected to the first switch, the second switch, and the third switch to control the first switch, the second switch, and the third switch, the BMC connected to the third switch; the control unit controlling the BMC storage to copy and store the data of the programs stored in the subsidiary BIOS storage when the second switch and the third switch is controlled by the control unit to connect the subsidiary BIOS storage to the BMC storage, and to transmit the copied data to the main BIOS storage when the first switch, the second switch, and the third switch is controlled by the control unit to connect the main BIOS storage to the BMC storage.

3. The BIOS circuit as claimed in claim 1, further comprising a south bridge chip (SBC), wherein the first switch and the BMC are both connected to the CPU by the SBC.

4. The BIOS circuit as claimed in claim 1, wherein the CPU generates feed signals sent to the BMC when the CPU successfully executes the programs stored in the main BIOS storage, and the BMC identifies that the data of the programs stored in the main BIOS storage is missing or corrupted when the BMC does not receive the feedback signals.

5. The BIOS circuit as claimed in claim 4, wherein the CPU generates different kinds of feedback signals corresponding to the programs stored in the main BIOS storage, and each kind of the feedback signals is sent to the BMC to inform the BMC that one program stored in the main BIOS storage and corresponding to this kind of feedback signal is successfully executed.

6. The BIOS circuit as claimed in claim 1, wherein the programs stored in both the main BIOS storage and the subsidiary BIOS storage includes self power on test (POST) program, initializing program, and bootstrap program.

7. A method for using a BIOS circuit to control a computer, comprising:
   executing programs stored in a main BIOS storage of the BIOS circuit to control the computer when a BMC of the BIOS circuit controls a first switch to connect the main BIOS storage to a CPU;
   when the programs stored in the main BIOS storage are successfully executed, generating feedback signals sent to the BMC of the BIOS circuit to inform the BMC that the computer is normally controlled;

when the feedback signals are not timely received by the BMC, identifying that data of the programs stored in the main BIOS storage are missing or corrupted; and copying data of programs stored in a subsidiary BIOS storage of the BIOS circuit when a second switch and a third switch is controlled by the BMC to connect the subsidiary BIOS storage to the BMC; and transmitting the copied data to the main BIOS storage to recover the missing or corrupted data in the main BIOS storage when the first switch, the second switch, and the third switch is controlled by the BMC to connect the main BIOS storage to the BMC.

8. The method as claimed in claim 7, wherein the CPU generates different kinds of feedback signals corresponding to the programs stored in the main BIOS storage, and each kind of the feedback signals is sent to the BMC to inform the BMC that one program stored in the main BIOS storage and corresponding to this kind of feedback signal is successfully executed.

9. The method as claimed in claim 8, wherein the steps of identifying that data of the programs stored in the main BIOS storage are missing or corrupted, and copying the data of programs stored in the subsidiary BIOS storage to the main BIOS storage to recover the missing or corrupted data in the main BIOS storage are performed when any kind of the feedback signals is not timely received by the BMC.

10. The method as claimed in claim 9, further comprising:
when more than one kinds of feedback signals or all kinds of feedback signals are not timely received by the BMC, identifying that data of more than one kinds of programs or all the programs stored in the main BIOS storage is missing or corrupted; and
copying all programs corresponding to the missing feedback signals stored in the subsidiary BIOS storage to the main BIOS storage to recover the missing or corrupted data in the main BIOS storage.

11. The method as claimed in claim 7, further comprising temporarily storing the copied data of programs stored in a subsidiary BIOS storage in the BMC before transmitting the copied data to the main BIOS storage to recover the missing or corrupted data in the main BIOS storage.

* * * * *